June 12, 1934. J. C. DALEY 1,962,431
METHOD FOR MAKING CORE LAMINATIONS
Filed Aug. 18, 1930 7 Sheets-Sheet 1

Inventor:
James C. Daley
By:
Brown, Jackson, Boettcher & Dienner
Attys

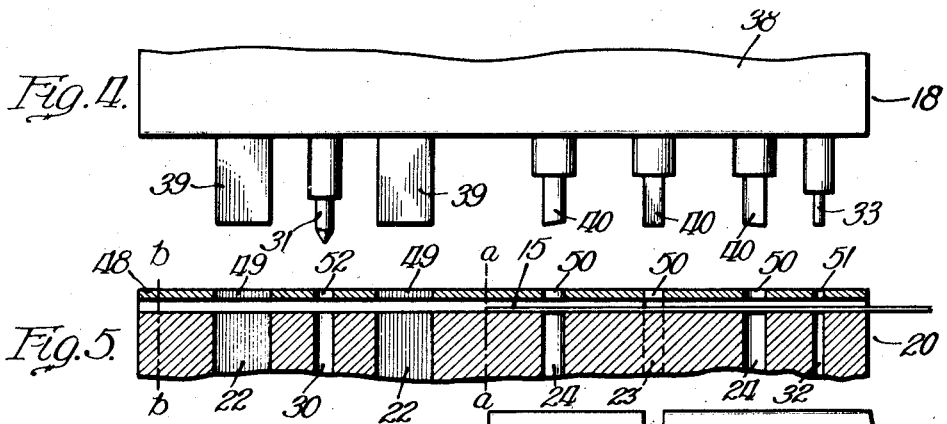
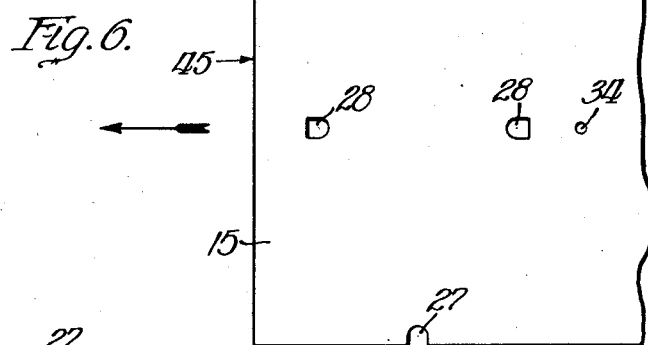
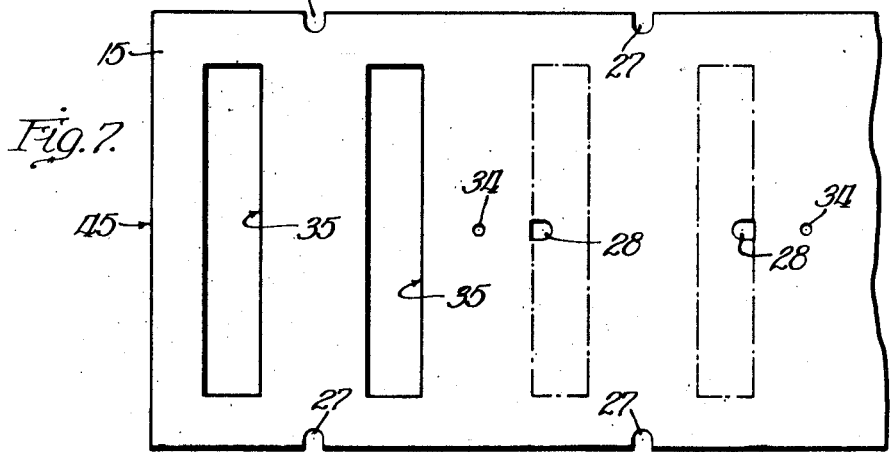

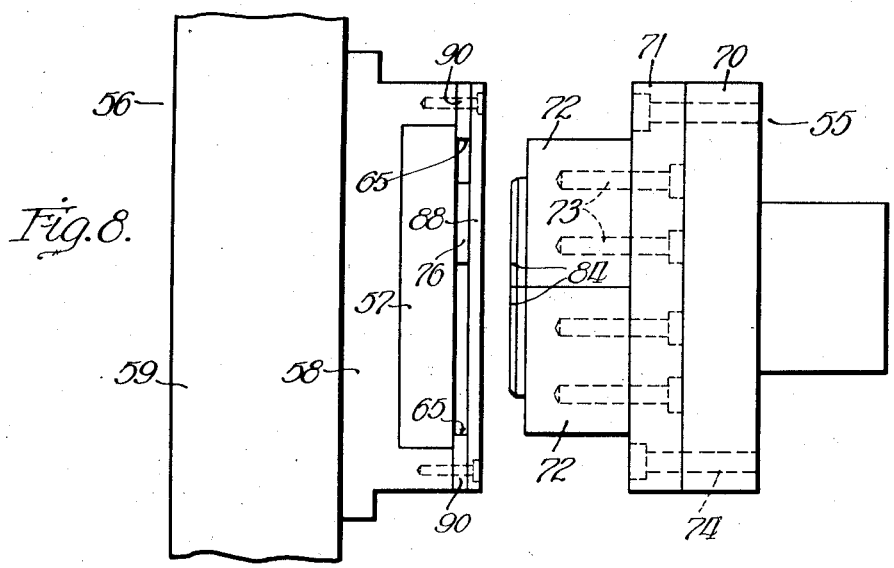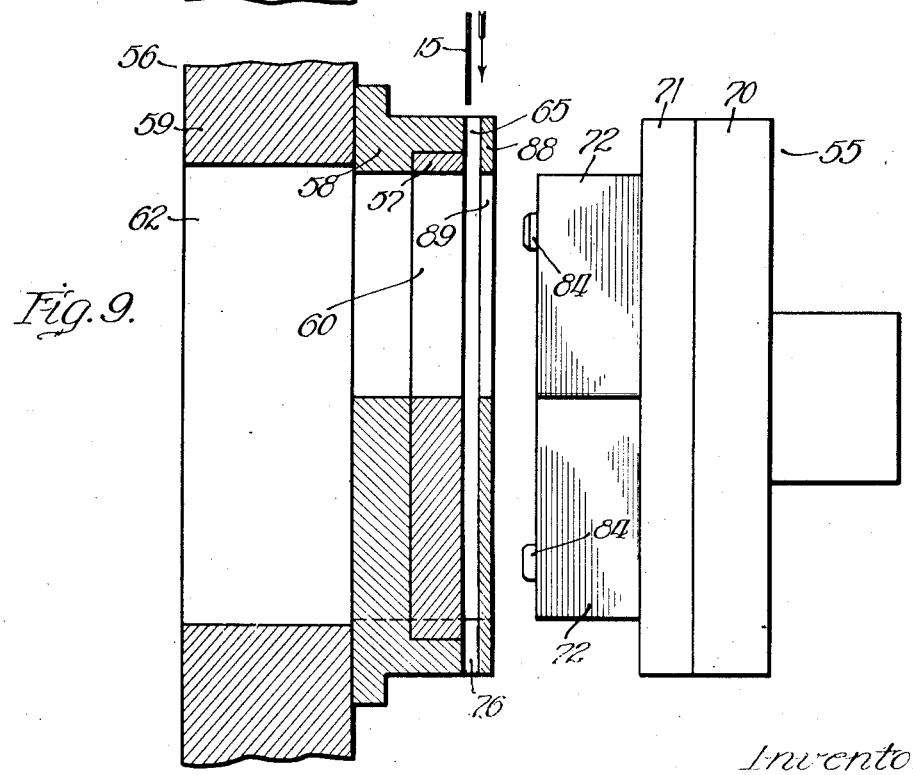

June 12, 1934.    J. C. DALEY    1,962,431
METHOD FOR MAKING CORE LAMINATIONS
Filed Aug. 18, 1930    7 Sheets-Sheet 4
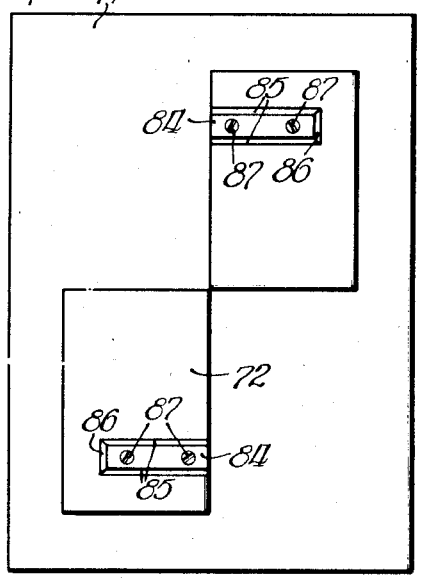
Fig. 10.
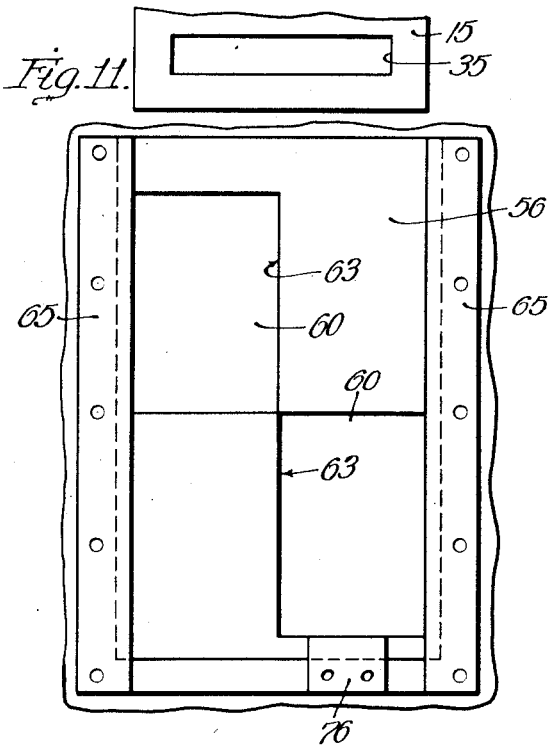
Fig. 11.
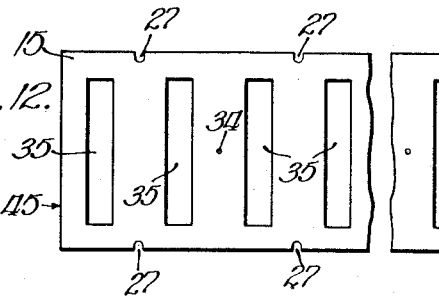
Fig. 12.
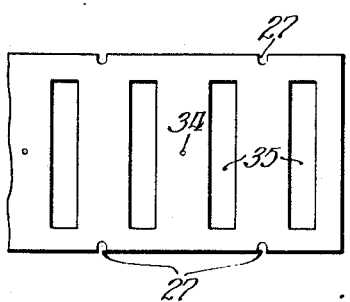
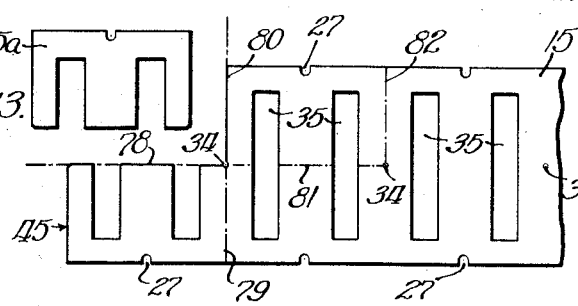
Fig. 13.
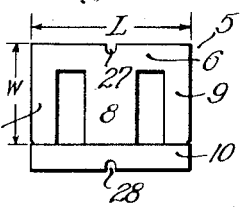
Fig. 14.
Inventor:
James C. Daley
By Brown, Jackson, Boettcher & Dienner
Attys.

June 12, 1934.                    J. C. DALEY                    1,962,431
                    METHOD FOR MAKING CORE LAMINATIONS
                Filed Aug. 18, 1930        7 Sheets-Sheet 5
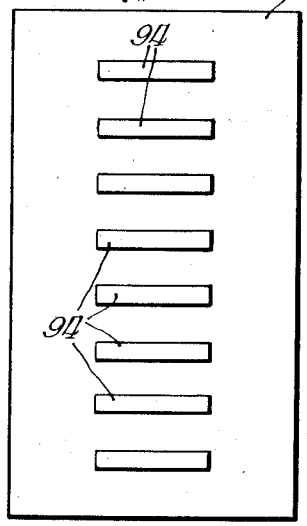
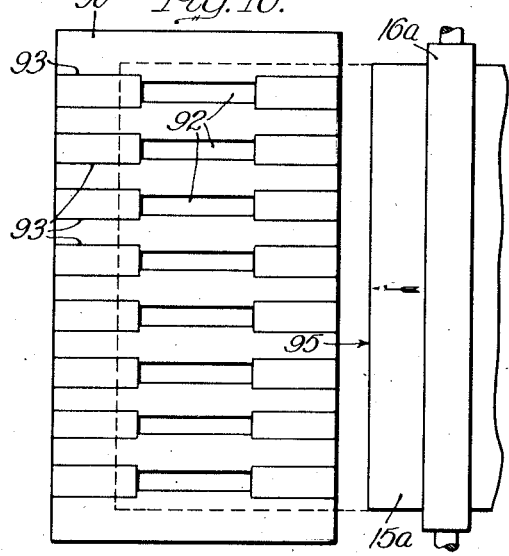
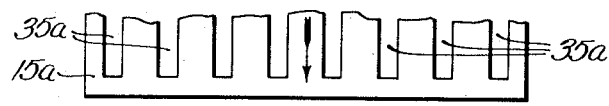
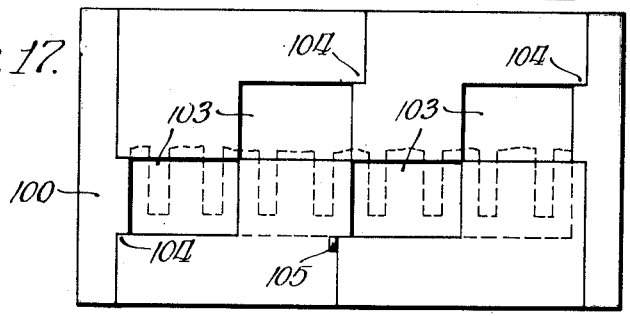
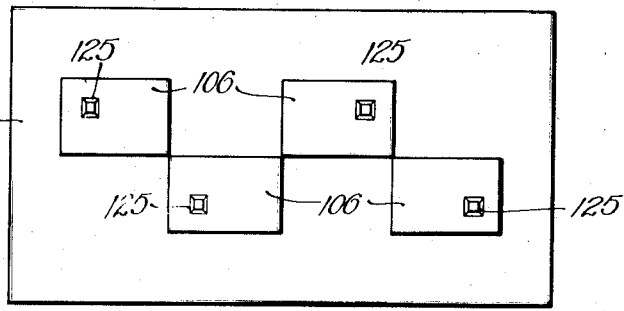
Inventor:
James C. Daley
By: Brown, Jackson, Boettcher & Dienner
Attys.

June 12, 1934.  J. C. DALEY  1,962,431
METHOD FOR MAKING CORE LAMINATIONS
Filed Aug. 18, 1930  7 Sheets-Sheet 6
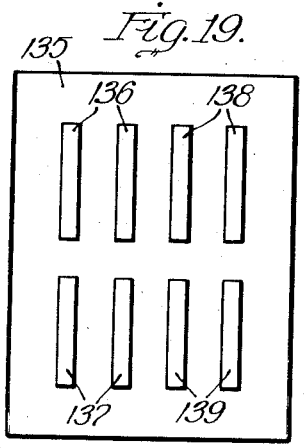
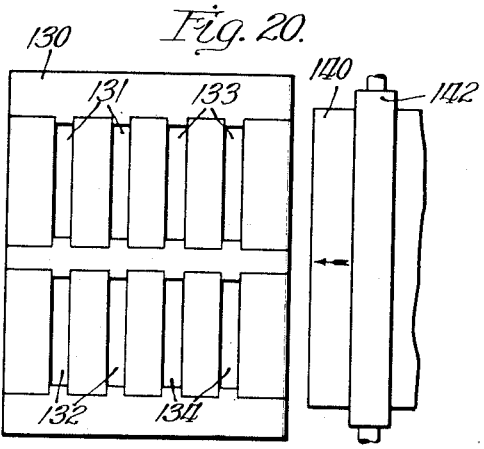
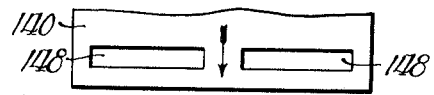
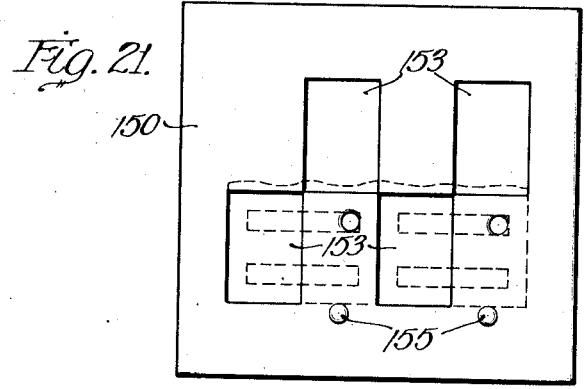
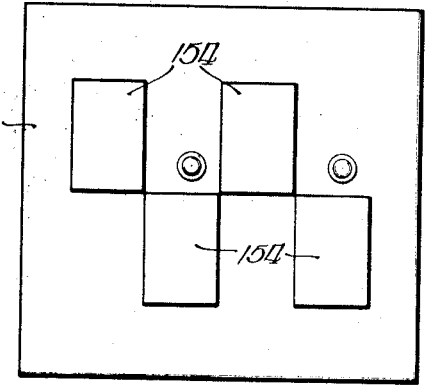
Inventor:
James C. Daley
By:
Brown, Jackson, Boettcher & Dienner
Attys.

June 12, 1934.  J. C. DALEY  1,962,431
METHOD FOR MAKING CORE LAMINATIONS
Filed Aug. 18, 1930    7 Sheets-Sheet 7

Inventor:
James C. Daley
By
Brown, Jackson, Boettcher & Dienner
Attys.

Patented June 12, 1934

1,962,431

UNITED STATES PATENT OFFICE 1,962,431

METHOD FOR MAKING CORE LAMINATIONS

James C. Daley, Chicago, Ill., assignor to Jefferson Electric Company, Chicago, Ill., a corporation of Illinois Application August 18, 1930, Serial No. 476,231

17 Claims. (Cl. 164—18)

My invention relates to core laminations, particularly for use in transformer cores and the like, and contemplates improvements in the method of and means for making these laminations.

More particularly my present invention resides in making the laminations from a relatively long strip by first cutting throughout the length of the strip all of the oblong openings for forming the windows or spaces between the legs of the laminations, and thereafter severing the strip across the openings and between each desired group of openings, these groups each comprising a pair of openings where it is desired to form E-shaped bodies.

By cutting all of the window forming openings first and severing the strip across these openings and between each pair of openings only after all of the oblong openings are completed, the punch and die elements are simplified and the chance of discrepancy is reduced. The cost of maintenance of the punch and die elements is also less because it is not necessary to grind these elements as frequently as it is where the oblong openings are cut and the severing of the strip is accomplished simultaneously. Where grinding is necessary it may be accomplished more easily than before. The punch and die elements are less complicated to set up, their size is reduced and the danger of shearing these elements in setting them up is less.

A further and important advantage of the present invention is that I am enabled to use part of the punch and die means on one machine, and the other part of the punch and die means on another machine. Both of the machines may be of the vertical type, or both of the machines may be of the horizontal type, or still further, one machine may be of the vertical type and the other machine of the generally horizontal type, in which case one machine of one type may be used with more than one machine of the other type. Obviously, where one type of machine is faster than the other, one of the fast machines may be used with more than one of the slower machines.

I find that by cutting the oblong openings or windows on a vertical type of machine and severing the strip across the openings and between the openings on machines of a horizontal type of machine, one or more machines of the vertical type may be combined with a greater number of machines of the horizontal type, and the lesser number of oblong opening cutting machines will be able to supply the strips with the oblong openings all cut therein at a rate sufficient to meet the demands of the rate at which they are handled with a greater number of machines for severing the strips across the openings and between the pairs of openings.

As illustrative of a particular practical application of the invention, I have combined one vertical machine for first cutting all of the oblong openings with two horizontal machines for thereafter severing the strips across the openings and between each pair of openings.

Another advantage resides in the ability of the punch and die elements for severing the strip across and between the openings to continue to operate in case of disability of the punch and die elements for cutting the oblong openings, and vice versa. If the severing punch or die means is disabled the continued operation of the oblong opening cutting punch and die means will build up a reserve of strips from which the oblong openings have all been cut, which strips will be available when the severing die and punch means is rendered operative, whereas if the oblong opening cutting means is disabled the means for severing the strips across and between the openings may continue in operation with this reserve.

Other advantages will appear from the following detailed description taken in connection with the accompanying drawings in which:

Figure 4 is a fragmentary side elevational view of the upper punch means of Figure 1;

Figure 5 is a fragmentary longitudinal section through the lower die and stripper means taken on the line 5—5 of Figure 2, Figure 5 being positioned below Figure 4 to show the operative relation of the punch and die means for cutting the oblong openings;

Figure 6 is a fragmentary plan of the strip of stock after punching the same with the first portion of the punch and die means shown in Figures 1 to 5;

Figure 7 is a view similar to Figure 6, showing the completed punching operation of the punch and die elements of Figures 1 to 5, which after the sheet metal strip is fully between the punch and die elements is repeated along the strip as it is advanced step by step between the punch and die elements;

Figure 8 is a top plan view of the punch and die means for severing the strip across and between the openings to form the laminations;

Figure 9 is a view of the punch and die means of Figure 8, partially in vertical section and partially in side elevation;

Figure 10 is a front elevational view of the punch means shown in Figure 8;

Figure 11 is a front elevational view of the die means shown in Figure 8;

Figure 12 is a plan view of the metal strip, partially broken away, and after completion of all of the generally oblong openings;

Figure 13 is a view similar to Figure 12 showing the manner of severing the strip across the openings and between the pairs or groups of openings after completion of said openings;

Figure 14 is a view illustrating one manner of making a core with the E-shaped laminations and rectangular strips formed by the present invention;

Figure 15 is a view similar to Figure 1 illustrating more or less diagrammatically another form of punch means embodying the present invention and adapted for cutting the oblong openings;

Figure 16 is a view similar to Figure 2 showing the mating die means for the punch means of Figure 15;

Figure 17 is a more or less diagrammatic front elevational view showing the die means for severing the strip across and between the openings after the cutting of said openings with the punch and die means of Figures 15 and 16;

Figure 18 is a diagrammatic front elevational view showing the mating punch means for the die means of Figure 17;

Figure 19 is a more or less diagrammatic bottom plan view illustrating another form of punch means embodying the present invention and adapted for cutting the oblong openings;

Figure 20 is a top plan view showing diagrammatically the mating die means for the punch means of Figure 19;

Figure 21 is a more or less diagrammatic front elevational view showing the die means for severing the strip across and between the oblong openings after the cutting of said openings with the punch and die means of Figures 19 and 20;

Figure 22 is a diagrammatic front elevational view showing the mating punch means for the die means of Figure 21;

Figure 1:
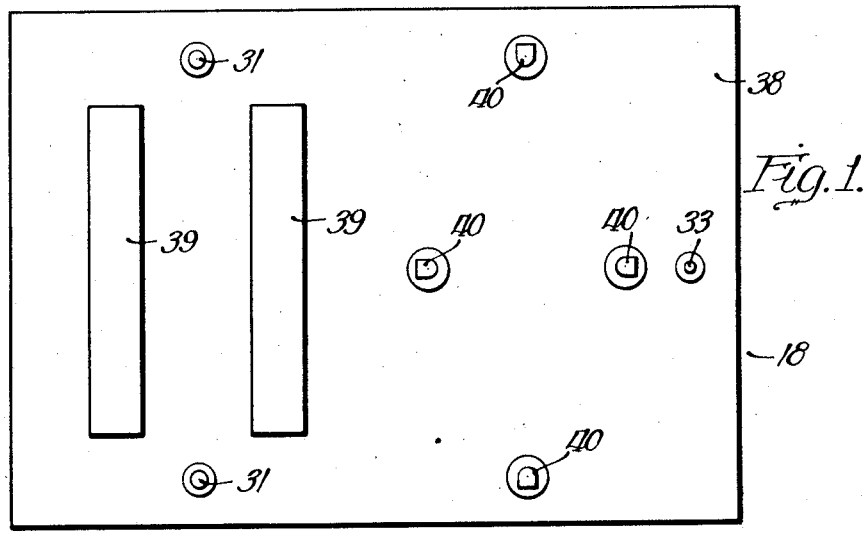
Figure 1 is a bottom plan view of the upper movable punch means for cutting the oblong openings.

Only so much of the punch and die means is illustrated in the drawings as is necessary to explain the present invention, it being understood that any details not shown may be of any existing or suitable type and may vary widely within the scope of the present invention.

In the illustrated embodiments of the invention each lamination 5 (Figure 14) is of E configuration, having a base 6 and three legs 7, 8 and 9 parallel with each other and at right angles to the base. All of the laminations formed in any one embodiment of the invention may be identical in contour and dimensions, although this may vary. The intermediate legs 8 which are disposed centrally between the outer legs 7 and 9 may be wider than the outer legs, as shown. The bases 6 are shown as of substantially the same width as the outer legs 7 and 9, but this too may vary.

In making up the transformer core the lamination 5 may be stacked with the legs 7, 8 and 9 upon each other and with the bases disposed alternately at opposite ends. The rectangular strips cut from the oblong openings which form the spaces between the legs 7, 8 and 9 may be of lengths equal to lengths L (Figure 14) of the E-shaped laminations and may be arranged across the legs 7, 8 and 9, as shown in Figure 14, to form the core. Where the straight strips 10 are used, as shown in Figure 14, the bases 6 need not, of course, be disposed alternately at opposite ends but may all be disposed at the same end, although the use of the straight strips 10 may be combined with the arrangement of the bases of the laminations alternately at opposite ends.

As well understood in the art, the coils may be wound around the intermediate legs 8 and through the spaces between the intermediate and outer legs, the intermediate legs extending through the coils and the outer legs together with the bases 6 forming a magnetic envelope completely surrounding the coils.

The stock from which the laminations are made is in the form of continuous strips 15 of sheet metal. The strips 15 are preferably long, relatively narrow strips and are substantially flat and may, of course, be of any suitable or preferred gauge or thickness. Sheet iron is commonly employed, and the laminations may be punched or stamped out cold.

Figure 2:
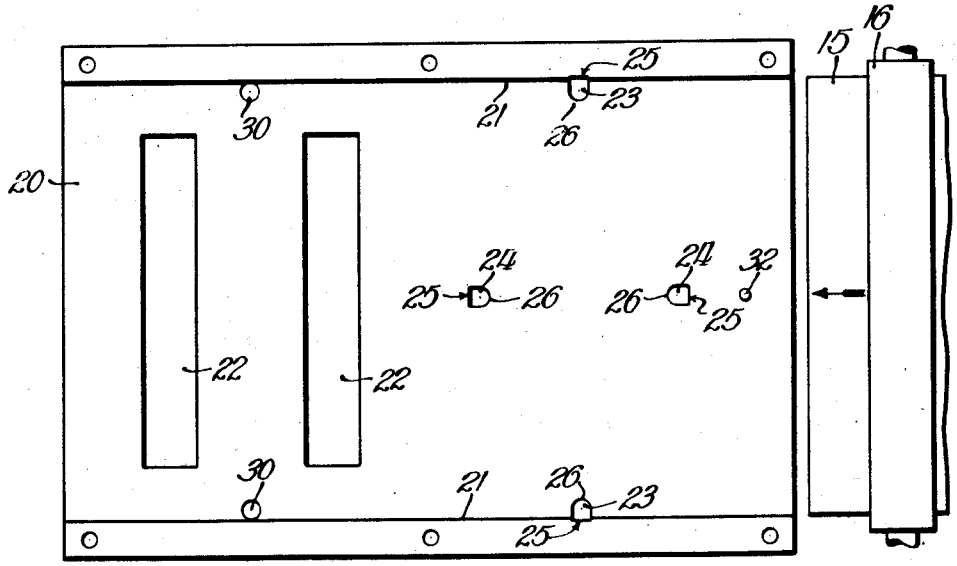
Figure 2 is a top plan view of the lower die means therefor.
Figure 3:
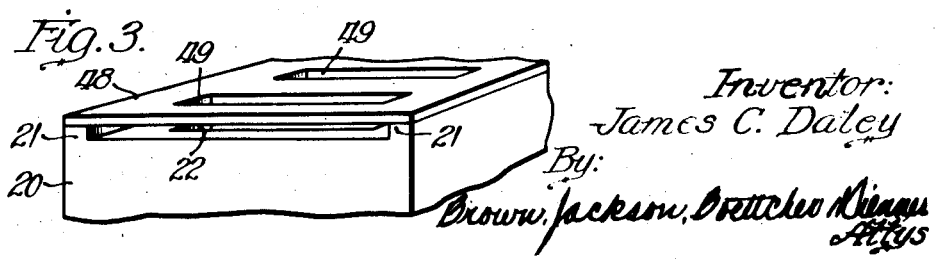
Figure 3 is a more or less diagrammatic fragmentary perspective view of the lower die means of Figure 2, showing a stock stripper therefor.

For the purpose of punching or stamping out the oblong openings according to Figures 1 to 13, inclusive, the strip 15 is first fed by suitable means designated diagrammatically at 16 in Figure 2, between the upper punch and lower die means 18 and 20 of a vertical press, the strip 15 being suitably guided and fed over the lower die 20. The feed means 16 forms means for positively feeding the strip of metal between the punch and die means, and the strip is advanced step by step, the steps of advance alternating with the strokes of the press so that after each stroke the strip will be advanced and positioned for the next stroke.

The lower die may be fastened down upon the bed of the press or other support. It may comprise the die proper, which may be secured by pressed fit or otherwise in an opening in a die block or plate which may in turn be fastened down upon the bed of the press in any suitable or preferred manner.

One means for guiding the strip 15 may comprise shoulders or flanges 21 formed along the opposite sides of the die 20. This, of course, may vary. For example, the guide means may be formed on the guide block or plate above referred to or, as a matter of fact, may be separate from either of these members, if found desirable or feasible.

The die 20 is provided with two parallel oblong or generally rectangular die openings 22, with their lengths disposed transversely across the path of movement of the strip between the punch and die means and with two pairs of relatively small die openings 23, 23 and 24, 24. The relatively small die openings 23 and 24 are preferably alike and each preferably has a flat base 25 and is rounded at its inner end at 26. The openings 24 are at the longitudinal median line of the strip 15 in its movement between the punch and die means, and the openings 23 are at the outer edges of the strip to cut the notches 27 centrally between the ends of the outer edges of the bases 6 of the laminations 5, as shown in Figure 14. The relatively small die openings 24 are so arranged as to form holes or perforations along the longitudinal median line of the strip, which holes or perforations form the notches 28 (Figure 14) one in the outer longitudinal edge of each of the straight pieces 10 which are stamped out by the die openings 22 and the cooperating punch means.

The outer ends of the openings 23 preferably extend outwardly of the inner guide edges of the shoulders or flanges 21 to assure opening of the notches 27 formed thereby from the outer edges of the strip 15.

The oblong die openings 22 and the relatively small openings 23 and 24 are all preferably bounded by relatively sharp cutting or shearing edges, as well understood in the art. The die 20 is, for the purpose of clarity, shown as made up in one or an integral piece, but it may, of course, in practice, be made up of a plurality of straight strips and blocks arranged and suitably interlocked to form the desired die openings. In practice it is usually desirable to avoid angular pieces in making up the die proper and to make the die up at least as completely as possible of straight oblong pieces, so that angular cutting edges and corners are avoided.

The die 20 is also provided with a pair of openings 30 for receiving aligning pins 31 on the punch means 18, and with an opening 32 for receiving a circular punch pin 33 on the punch means 18. The opening 32 is on the longitudinal median line of the strip of metal 15 in its passage between the punch and die means, and is disposed to form the relatively small openings 34 (Figure 7) one centrally between each pair of openings 35 from which the straight pieces 28 are punched by the die openings 22 and their cooperating punch means. The purpose of forming the openings 34 will appear as this description proceeds.

One of the openings 30 is disposed adjacent each of the inner guide edges of the guides 21, and these openings 30 are in transverse alignment along an imaginary line centrally between the die openings 22.

The cooperating punch means 18 is reciprocable up and down into and out of cooperation with the lower die means 20. It comprises a block 38 in which the upper ends of the punch members 39 and punch pins 40 are secured. This block 38 is, in turn, suitably mounted upon the vertically reciprocating carriage of the press. The punch members 39 are bounded by relatively sharp cutting edges and conform peripherally with the die openings 22, whereas the punch pins 40 are likewise bounded by relatively sharp cutting edges and conform peripherally with the die openings 23 and 24. The downward stroke of the punch carriage or block 38 moves the generally rectangular or oblong punches 39 down into the mating die openings 22 and the punch pins 40 down into the mating die openings 23 and 24, and upon the upward movement of the punch carriage the punches are elevated from the die openings to substantially the position shown in Figures 4 and 5.

The aligning and positioning pins 31 are also secured to the block 38, as is the punch pin 33, and these pins also move down into the openings 30 and 32 upon the downward stroke of the punch and upon the upward movement of the punch are withdrawn and elevated from these openings, as shown in Figures 4 and 5.

The sheet metal strip 15 is fed between the punch and die members in the direction indicated by the arrow in Figure 2. The machine being of the vertical type the path of feed is generally horizontally disposed.

Assuming that the metal strip is initially entered with its inner end 45 to the left (Figure 2) of the left hand opening 24 a distance substantially equal to the width of one of the outer legs 7, 9 of the resulting laminations, the initial stroke of the press will move the punch pins 40 and the punch pin 33 down through the strip and into the mating openings 23, 24 and 32, cutting out the two openings 28 along the longitudinal median line of the strip, the two notches 27 at the outer sides or longitudinal edges of the strip and the opening 34. The strip 15 is shown in substantially this position in Figure 5. Upon the succeeding upward movement of the punch means 18 the punch pins 40 and the punch pin 33 are withdrawn from the die openings and the feeding mechanism 16 then functions to positively feed the strip 15 forwardly sufficiently to dispose the notches 27 in substantial register with the die openings 30.

Upon the next succeeding downward stroke of the punch means the punch members 39 pass through the strip 15 and down into the die openings 22, punching the oblong straight pieces 10 and forming the parallel openings 35 transversely across the path of movement of the metal strip. In the downward movement of the punch the aligning and positioning pins enter the notches 27 first and the lower ends of these pins 31 being tapered, as shown in Figure 4, they will align the stock and hold it in position so that the oblong openings 35 will be properly related to the next pair of oblong openings and so that these oblong openings will be punched with respect to the openings 28, notches 27 and openings 34 in the manner illustrated in full and dotted lines in Figure 7.

Simultaneously with the punching of the openings 35 the punch pins 40 and the punch pin 33, together with the die openings 23, 24 and 54 punch the openings 28, notches 27 and openings 34 in the next succeeding area of the metal strips, as indicated in Figure 7. It is understood that in succeeding operations when the punch means is separated from the die means the feeding mechanism 16 feeds the strip 15 longitudinally a distance equal to the longitudinal distance from a point centrally between one pair of openings 35 to a point centrally between the next succeeding pair of openings, or a distance equal to the distance from the dot and dash line a in Figure 5 to the dot and dash line b, the dot and dash line b being disposed to the left of the left hand die opening 22 (Figure 5) a distance substantially equal to the width of one of the outer legs of the resulting laminations.

The oblong opening punching operations are continued until the successive groups or pairs of oblong openings are completed throughout the length of the strip, as shown in Figure 12 and then, according to the method of the present invention, the strip is severed longitudinally thereof in this particular embodiment across the oblong openings 35, and also transversely in this particular embodiment between each pair of openings to form the E-shaped bodies or laminations.

Suitable means may be provided for stripping the stock from the punch means of the press. The stripper may be in the form of a stripper plate 48 (Figures 3 and 5) rigidly secured in spaced relation over the die 20 and provided with openings 49, 50 and 51 corresponding with the die openings 22, 23 and 24 and 32, respectively, so that the respective punch elements may pass through the stripper plate 48 and into the respective die openings. The stripper plate 48 also has openings 52 to permit the aligning and positioning pins 31 to pass therethrough and into the openings 30. This stripper means may vary widely. In the illustrated embodiment the stripper plate 48 is mounted upon the shoulders or flanges 21 and held in spaced relation over the die proper thereby.

For the purpose of severing the strip across the oblong openings 35 and also between the pairs or groups of these openings the strip after completion of all of the oblong openings 35 throughout the length of the strip is fed between punch and die means 55 and 56, shown in Figures 3, 9, 10 and 11.

The punch and die means 55 and 56 may constitute the punch and die means of a generally horizontal type of press, it being understood that although this particular punch and die means is shown in Figures 8 to 11, inclusive, as acting horizontally, the punch and die members may be inclined to the horizontal as desired.

The die means 56 comprises the die proper 57 secured in the die block 58, which is in turn secured to the bolster 59 of the press.

The die 57 is provided with two generally rectangular die openings 60, which correspond with the outer contours of the laminations 5 and are the openings for blocking out or forming the outer contours of the laminations. These openings 60 are bounded by relatively sharp cutting edges and are positioned in staggered relation one at each side of the center line of the generally vertical path of travel of the strip 15 between the punch and die means 55 and 56. The openings 60 preferably extend on through the block 58 and the bolster of the press or other support 59 is open at 62. The cutting edges 63 of the openings 60 are aligned on a longitudinal median line along the path of travel of the strip and the generally vertically disposed longitudinal dimensions of the openings 60 are equal to the lengths L of the laminations 5, (Figure 14), whereas the widths of the openings 60 are substantially equal to the widths W of the laminations 5. The strip 15 may be guided generally vertically between the punch and die means 55 and 56 by guide shoulders or flanges 65 formed along the opposite sides of the die 56. The inner guide edges of the guides 65 are preferably disposed at the outer vertical edges of the die openings 60, or the outer edges of these openings 60 may extend outwardly slightly of the guide edges of the guides 65 to assure blocking of the laminations out through the opposite edges of the metal strips at all times.

The cooperating punch means 55 is reciprocable generally horizontally into and out of cooperation with the die means 56. It comprises a punch holder 70, punch plate 71 and punch members proper 72. The punch members 72 are bounded by relatively sharp cutting edges and are of generally rectangular configuration conforming peripherally with the mating die openings 60. They may be secured to the plate 71, as indicated at 73, and the plate may in turn be secured to the punch holders 70 as indicated at 74, although this may vary widely. The generally horizontal stroke of the punch toward the die means moves the punches 72 into the mating die openings 60 and upon the outward movement of the punch the punches are withdrawn from the die openings as shown in Figures 8 and 9.

The strip of sheet metal stock 15 with all of the oblong openings 35 formed therein, as shown in Figure 12, is fed generally vertically between the punch and die means 55 and 56 in the direction indicated by the arrow in Figure 9. The feed is by gravity, or at least partially by gravity, the operator being usually depended upon to assist gravity by hand in feeding the strips between the punch and die means. Stop means 76 is preferably provided for stopping the end of the strip at the lower cutting edge of the lower die opening 60 or just slightly ahead of said lower edge to assure complete blocking out of the lamination upon operation of the press. With the lower end of the metal strip thus positioned, the first stroke of the punch into engagement with the die punches out two E-shaped laminations in staggered relation along the lines 78, 79, 80, 81 and 82 of Figure 13. At the same time the other lamination 15a is freed upon the initial blocking operation upon the strip and this lamination may drop out generally vertically from the face of the die 57.

Upon completion of this blocking out operation the lower end of the strip is formed by the lines of cuts 82, 81 and 79, and after withdrawing the punch from the die the strip is fed forward a distance substantially equal to the length L of the lamination, whereupon the succeeding strokes block out two staggered E-shaped laminations similar to the two laminations blocked out in staggered relation upon the first stroke of the punch as described. Obviously, the small openings 34 assure that the staggered E-shaped bodies will be separated at all times at the meeting inner corners of the punches 72 and die openings 60. It is to be understood that the outer longitudinal edges of the metal strip may be cut to shape independently of the punching operations herein described. The blocking out punch and die means severs the strip longitudinally along the median line thereof, and longitudinally across the transverse oblong openings 35, centrally between the opposite ends of these openings, and also transversely between each pair of openings along the lines 79, 80 and 82 for example.

For the purpose of assuring proper positioning of the metal strip with its oblong openings 35 with respect to the punches 72 and die openings 60, each of the punch members 72 is provided with a generally rectangular pilot or positioning block 84. These blocks 84 are parallel and transversely elongated with their widths substantially equal to the widths of the oblong openings 35, and the opposite sides 85 and one end of each at 86 are preferably tapered downwardly, as shown in Figure 10, so that when the openings 35 are disposed between the punch and die means 55 and 56 the outer narrower ends of the blocks 84 will enter the openings 60 in movement of the punch into cooperation with the die and in spite of lack of exact positioning of the strip. Then upon completion of the punching stroke the tapered ends of the blocks will pilot the stock to proper position, and these blocks 84 upon completely entering the openings 35 will assure such position and retain same in the operation of the press, it being understood that the tapered edges 85 cooperate with the opposite longitudinal edges of the openings 35 and that the tapered ends 86 cooperate with the ends of the openings 35 in the positioning action. The blocks 84 may be rigidly secured to the face of the punch member 72 at 87.

Suitable means may be provided for stripping the stock from the punch means of the press. The stripper may be in the form of a stripper plate 88 rigidly secured in spaced relation over the die and provided with openings 89 corresponding with the die openings 60 to permit movement of the punch elements through the stripper plate into the respective die openings. In the particular embodiment illustrated the stripper plate 88 is secured at 90 to the guide flanges or shoulders 65 and is spaced from the face of the die proper 57 thereby.

The notches 27 formed in the bases of the laminations 5 and the notches 28 formed in one edge of each of the pieces 10 are for purposes of assembly. When, for example, the laminations are assembled as shown in Figure 14 these notches 27 and 28 may be disposed to receive the posts or other means used in binding the laminations together.

In the embodiment of Figures 15, 16, 17, 18, 23 and 24, the oblong openings 35a are stamped out with their lengths disposed longitudinally of the strip 15a, and provision is made for stamping out four pairs of these openings 35a across the width of the strip. This embodiment of the invention not only increases the number of laminations which are blocked out upon each stroke of the press, but merely by using strips of metal which are somewhat wider the number of laminations blocked out for a given length of strip is increased.

Figure 23:
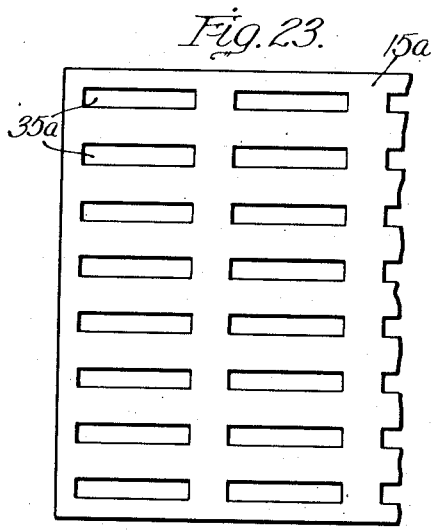
Figure 23 is a fragmentary plan view of a metal strip after cutting the oblong openings in accordance with the present invention, these openings in this case being disposed with their lengthwise dimensions longitudinally of the strip of stock and there being a plurality of groups or pairs of said openings transversely across the strip.

As before, the oblongs 35a are formed throughout the length of the strip, as shown in Figure 23, before blocking the laminations from the strip.

The means for punching the openings 35a comprises lower die means 90 and upper vertically reciprocating punch means 91, the strip 15a being fed between this punch and die means by suitable means designated diagrammatically at 16a in Figure 16, the strip being preferably suitably guided in its passage over the die 90.

The die 90 is provided with four pairs of parallel oblong or generally rectangular die openings 92 disposed with their lengths longitudinally of the path of movement of the metal strip 15a between the punch and die means. The die openings 92 are all bounded by relatively sharp cutting edges and as before, the widths of the openings 92 are substantially equal to the widths of the spaces between the legs 7, 8 and 9 of the laminations, whereas the length of each opening is preferably substantially equal to twice the length of the space between the legs 7, 8 and 9. The die 90 is shown as made up of a plurality of strips or blocks assembled and suitably interlocked, as indicated at 93. The die openings 90 are thereby formed by cutting edges which may be conveniently assembled to form the openings and which may be conveniently ground and sharpened as desired.

The cooperating upper punch means 91 is reciprocable up and down into and out of cooperation with the die 90, and it comprises a block to which the punch members 94 are secured and which may be in turn mounted upon the vertically reciprocating carriage of the press. The punch members 94 are likewise bounded by relatively sharp cutting edges and conform peripherally with the die openings 92, the downward stroke of the punch moving the punches 94 into the mating die openings 92 and stamping out the oblong openings 35a as shown in Figure 23.

Figure 24:
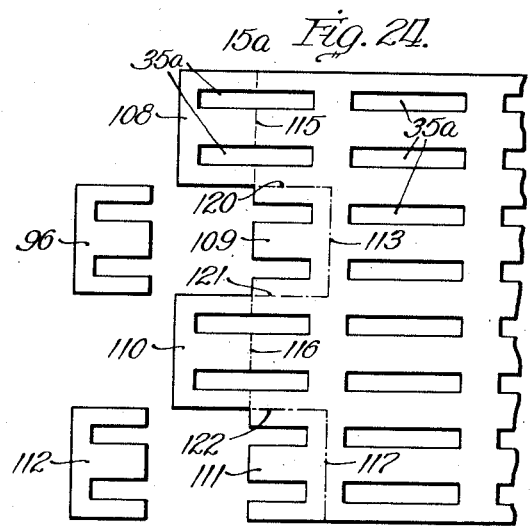
Figure 24 is a view similar to Figure 23, showing the manner of severing across and between the groups of openings to block the laminations from the strip of stock.
Figure 25:
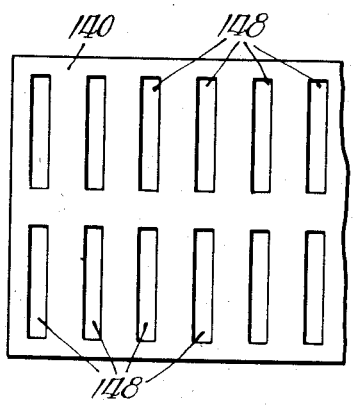
Figure 25 is a plan view of another strip of stock after completion of the oblong openings with the punch and die means of Figures 19 and 20.

The sheet metal strip 15a is fed between the punch and die members generally horizontally and in the direction indicated by the arrow in Figure 16. The feeding means 16a, as before, advances the strip 15a step by step, the steps of advance alternating with the strokes of the press. The end 95 of the strip is initially positioned to the left of the left hand end of the die openings 92 (Figure 16) a distance equal to the width of the base 96 of the resulting laminations (Figure 24). The first and every succeeding punching stroke of the press punches out four pairs of oblong openings 35a. This is continued until all of the oblong openings 35a are formed throughout the length of the strip of stock. Then after completion of all of the oblong openings 35a throughout the length of the strip the strip is severed across the openings and between the pairs of groups of openings to form the E-shaped bodies. This is accomplished by a die 100 and a generally horizontally reciprocating punch 102 (Figures 17 and 18).

The die 100 is provided in this embodiment with two pairs of staggered rectangular die openings 103 disposed with their lengths transversely across the path of travel of the stock and with their widths or shorter dimensions longitudinally of the stock. The die openings 103 are formed by blocks set up and interlocked as indicated at 104, and a stop is provided at 105 for initially positioning the end of the metal strip at or just above the lower ends of the lower openings 103 as viewed in Figure 17. For all succeeding blocking out operations the stop 105 positions the strip as shown in dotted lines in Figure 17.

A cooperating punch 102 is reciprocable generally horizontally into and out of cooperation with the die means 100 and comprises a block carrying the punch members 106, the block being in turn mounted upon the horizontally reciprocating carriage of the press. The punch members 106 are bounded by relatively sharp cutting edges and conform peripherally with the die openings 103. Their arrangement also corresponds with the arrangement of the die openings 103 so that the movement of the punch toward the die moves the punch members 106 into the mating die openings 103.

The metal strip is fed generally vertically between the punch and die members in the direction indicated by the arrow in Figure 17. The end of the strip may be initially entered to engage the stop 105, whereupon the initial blocking out stroke of the punch blocks out the laminations designated 108, 109, 110 and 111 in Figure 24, the laminations 96 and 112 being freed thereby so that six E-shaped bodies are formed upon the initial stroke of the press. The strip of metal is then advanced longitudinally a distance sufficient to bring, for example, the edge indicated at 113 in Figure 24 into engagement with the stop 105, whereupon the next and all succeeding strokes of the press block out four E-shaped bodies in staggered order as the strip is fed through the machine. The lines of cut 113, 115, 116 and 117 are disposed transversely of the path of movement of the strip, the lines of cut 115 and 116 severing the strip transversely across the oblong openings 35a and centrally between the ends of said openings, whereas the lines of cut 113 and 117 sever the strip transversely between two pairs of oblong openings and the next two succeeding pairs of said openings. The lines of cut 120, 121 and 122 extend longitudinally of the strip and one is disposed between each pair of transversely aligned oblong openings 35a. The metal strip may be perforated similar to the perforating at 34 in the previous embodiment to assure separation of the E-shaped bodies if desired.

The punch members 102 are preferably provided with pilot or positioning blocks 125. These blocks travel ahead of the actual blocking out edges of the punch members 106 and enter the openings 35a to position and maintain the positioning of the strip in the blocking out operation. Their inner ends are preferably tapered, as shown in Figure 18, so that in case of inaccurate positioning of the strip the tapered edges will by their cooperation with the opposite sides and the ends of the openings 35 shift the stock slightly to properly aligned position so that the laminations will be blocked out accurately with respect to the openings 35a. The blocks 125 may be rigidly secured to the faces of the punch members 106.

In the other embodiment of the invention shown in Figures 19, 20, 21, 22, 25 and 26 I provide for punching four pairs of oblong openings with each punching stroke of the press, two pairs transversely across the width of the stock and two pairs longitudinally of the stock.

In this case the die 130 (Figure 20) has four pairs of oblong openings 131, 132, 133 and 134, and the cooperating vertically reciprocable upper punch 135 has four pairs of co-operating punch members 136, 137, 138 and 139. The strip of metal 140 is fed horizontally over the lower die means 130 and between the die means and the upper vertically reciprocating punch means 135 in the direction indicated by the arrow in Figure 20. The means for feeding the stock is indicated at 142 and this means preferably forms a part of this feed for advancing the stock step by step between the punch and dies means. The die openings 131, 132, 133 and 134 and the punch members 136, 137, 138 and 139 which conform peripherally and mate with the die openings, are disposed with their lengths transversely of the path of travel of the strip of sheet metal 140, the spaces between the two openings of each pair of openings being equal to the width of the intermediate legs 143 of the resulting E-shaped laminations 144 (Figure 26), whereas the transverse space between the openings 131, 133 and the openings 132, 134 is equal to twice the width of the base 145 of the resulting laminations. The longitudinal distance between the pairs of openings 131, 132 and the pairs of openings 133, 134 is equal to twice the width of the outer legs 146 of the resulting laminations.

Each stroke of the punch 135 produces four pairs of openings 148 and these oblong openings 148 are completed throughout the length of the strip 140 before blocking out the laminations.

After forming all of the oblong openings 148 throughout the length of the strip the E-shaped laminations are blocked out by severing the strip across the oblong openings and also between pairs of said openings.

The means for blocking out the E-shaped bodies in this embodiment comprises die means 150 (Figure 21) and cooperating generally horizontally reciprocable punch means 152. The die 150 has two pairs of staggered rectangular die openings 153 similar to the die openings of Figure 17, but with their lengths disposed longitudinally of the path of travel of the strip of metal 140 and with their widths disposed transversely of the path of travel of the strip.

The punch means 152 has the two pairs of generally rectangular staggered punch members 154 conforming peripherally with the die openings 153 and positioned to enter these openings upon movement of the punch toward the die. The sheet metal strip 140 is fed between the punch and die means 150 and 152 in the direction indicated by the arrow in Figure 21; stop means being provided at 155 to engage the inner end of the metal strip and stop the same in position for the blanking out operation. After the initial blanking out operation the two laminations 143 and 160 having been removed eight E-shaped lamination bodies 156, 162, 158, 159, 300, 301, 302 and 303 are formed upon each succeeding stroke of the press, the strip being advanced a distance equal to twice the length of the laminations between the successive strokes.

The number of laminations blanked out or formed upon each stroke may vary widely within the scope of the present invention, it being now contemplated as entirely practicable to form from two to sixty-four lamination bodies upon each stroke of the press according to the present invention.

Figure 26:
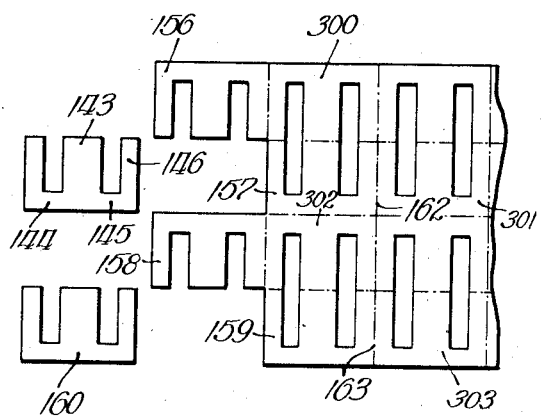
Figure 26 is a view similar to Figure 25, showing the manner of blocking out the laminations from the metal strip shown in Figure 25 and with the punch and die means shown in Figures 21 and 22.

There are divisions along the lines of cut indicated in Figure 26, there being lines of cuts longitudinal of the strip and across the oblong openings 148 centrally between the opposite ends thereof, there being longitudinal cuts along the longitudinal median line of the strip, as well as transverse cuts transversely between the pairs of oblong openings.

The advantages of first forming all of the oblong openings throughout the length of the strip of stock and thereafter severing the strip across and between these openings to blank out the E-shaped body, and the advantages of the other aspects of the present invention are either fully set out at the outset of this specification or are obvious from the foregoing disclosure and this description will not, therefore, be burdened further with these at this time.

I claim:

1. Method of making core laminations from an integral strip of a length sufficient to form a plurality of such laminations which consists in first cutting throughout the length of the strip oblong openings for forming the spaces between the legs of all the laminations and thereafter in a second stage and after formation of all said oblong openings throughout the length of the strip dividing the strip lengthwise and successively into a plurality of individual laminations by severing the strip across and also between said openings to form the laminations.

2. Method of making core laminations from an integral strip of a length sufficient to form a plurality of such laminations which consists in first cutting successive groups of oblong openings, completing all of the successive groups of oblong openings throughout the length of the strip, and thereafter in a second stage and after completion of all of said groups of oblong openings blocking out the individual laminations successively from said strip by severing the strip across the openings and also between pairs of said openings to form laminations having base parts with spaced legs projecting therefrom.

3. Method of making core laminations from an integral strip of a length sufficient to form a plurality of such laminations which consists in first cutting successive pairs of oblong openings transversely of and entirely within the strip and in a second stage and after completion of all of the successive pairs of oblong openings in said strip blocking out the individual laminations successively from said strip and lengthwise thereof by severing the strip longitudinally thereof across said openings and also transversely between pairs of openings to form E-shaped bodies.

4. Method of making core laminations from an integral strip of a length sufficient to form a plurality of such laminations which consists in first cutting successive groups of oblong openings entirely within the width of the strip and with their lengths disposed longitudinally of the strip, and after completion of all of the successive groups of oblong openings throughout the length of the strip cutting out the individual laminations successively along the length of the strip by severing the strip transversely thereof across said openings and also longitudinally between pairs of openings to form the laminations.

5. Method of making core laminations from an integral strip of a length sufficient to form a plurality of such laminations which consists in first cutting successive groups of oblong openings entirely within the width of the strip and with their lengths disposed longitudinally of the strip, and after completion of all of the successive groups of oblong openings through the length of the strip cutting out the individual laminations successively along the length of the strip by severing the strip transversely thereof across said openings and also longitudinally and transversely thereof between groups of said openings to form the laminations.

6. Method of making core laminations from a continuous strip of a length sufficient to form a plurality of such laminations which consists in first cutting successive groups of oblong openings entirely within the width of the strip and throughout the length of the strip, and after completion of all of these successive groups of oblong openings by successive operations blanking out the core laminations in staggered relation.

7. Method of making core laminations from a continuous strip which consists in first cutting successive groups of oblong openings entirely within the strip and after completion of all of the successive groups of oblong openings in said strip by successive operations cutting off E-shaped bodies alternately from one side and the other of the strip.

8. Method of making core laminations from a continuous strip which consists in first cutting successive pairs of oblong openings transversely of and entirely within the width of the strip and after completion of all of the successive pairs of oblong openings in said strip by a succession of longitudinal cuts at the center of the strip and across the oblong openings and by a succession of transverse cuts extending to the central longitudinal cuts severing E-shaped bodies alternately from one side and the other of the strip.

9. Method of making core laminations from a continuous strip which consists in first cutting successive pairs of oblong openings transversely of and entirely within the width of the strip and after completion of all of the successive pairs of oblong openings in said strip by a succession of groups of transversely spaced longitudinal cuts across and between the oblong openings and by a succession of transverse cuts extending between pairs of said oblong openings and to said longitudinal cuts severing E-shaped bodies from opposite ends of the oblong openings.

10. Method of making core laminations from a continuous strip which consists in cutting by a vertically directed cutting motion successive oblong openings entirely within the strip and by a generally horizontally directed cutting motion severing the strip across said oblong openings and also between each oblong opening to form lamination bodies.

11. Method of making core laminations from a continuous strip which consists in first cutting by vertically directed cutting motions successive pairs of oblong openings transversely of and entirely within the strip and after completion of all of the successive oblong openings in said strip by generally horizontally directed cutting motions cutting across the oblong openings longitudinally of the strip and by a succession of transverse cuts extending to said longitudinal cuts severing lamination bodies alternately from opposite ends of the oblong openings.

12. The method of blocking out core laminations from a metal strip which consists in first punching a hole in the metal strip and thereafter blocking out two pairs of obliquely disposed laminations with the adjacent corners of the laminations intersecting said hole.

13. Method of blocking out core laminations which consists in first punching a hole in the metal strip and thereafter blocking out the laminations in staggered relation with the adjacent corners of the laminations intersecting said hole.

14. The method of making core laminations from an integral strip of a length sufficient to form a plurality of such laminations lengthwise of the strip which consists in first cutting throughout the length of the strip oblong openings for forming the spaces between the legs of all laminations formed from said strip and thereafter cutting out the individual laminations successively along the length of the strip by successive groups of cuts across and between said oblong openings.

15. In the operation of making core laminations from an integral strip the length of which is sufficient to form a plurality of such laminations, the improved method comprising cutting first and in one stage of the operation and throughout the length of the strip oblong openings for forming the spaces between the legs of all laminations formed from said strip, and thereafter in a second stage of operation and after formation of all said oblong openings throughout the length of the strip blocking out the individual laminations successively from said strip lengthwise thereof by cuts across and between said oblong openings.

16. The method of making core laminations from an integral strip of a length sufficient to form a plurality of such laminations which consists in cutting in a first stage throughout the length of the strip oblong openings for forming the spaces between the legs of all the laminations, thereafter in a second stage and after formation of all said oblong openings throughout the length of the strip dividing the strip lengthwise and successively into a plurality of individual laminations by severing the strip across and also between said openings to form the laminations, and utilizing openings formed in the first stage to align the strip for the second stage.

17. The method of making core laminations from an integral strip of a length sufficient to form a plurality of such laminations which consists in cutting in a first stage successive groups of oblong openings, completing all of the successive groups of oblong openings throughout the length of the strip, thereafter in a second stage and after completion of all of said groups of oblong openings blocking the individual laminations successively from said strip by severing the strip across the openings and also between pairs of said openings to form laminations having base parts with spaced legs projecting therefrom, and utilizing openings formed in the first stage to align the strip for the second stage.

JAMES C. DALEY.